(12) United States Patent
Wohlford et al.

(10) Patent No.: US 8,720,846 B2
(45) Date of Patent: May 13, 2014

(54) TELEVISION SAFETY STRAP

(75) Inventors: James G. Wohlford, Savage, MN (US); Jason Schmidt, Shakopee, MN (US)

(73) Assignee: Milestone AV Technologies LLC, Eden Prairie, MN (US)

( * ) Notice: Subject to any disclaimer, the term of this patent is extended or adjusted under 35 U.S.C. 154(b) by 0 days.

(21) Appl. No.: 13/382,135

(22) PCT Filed: Jul. 6, 2010

(86) PCT No.: PCT/US2010/041064
§ 371 (c)(1),
(2), (4) Date: Mar. 1, 2012

(87) PCT Pub. No.: WO2011/003114
PCT Pub. Date: Jan. 6, 2011

(65) Prior Publication Data
US 2012/0145873 A1    Jun. 14, 2012

Related U.S. Application Data

(60) Provisional application No. 61/222,989, filed on Jul. 3, 2009.

(51) Int. Cl.
*B65D 63/00* (2006.01)
*A47B 97/00* (2006.01)
*H04N 5/65* (2006.01)

(52) U.S. Cl.
USPC ........... 248/499; 248/500; 248/505; 348/818; 348/825; 348/843; 348/373; 348/375

(58) Field of Classification Search
USPC .......... 248/500, 505, 499; 348/818, 825, 836, 348/843, 373, 375
See application file for complete search history.

(56) References Cited

U.S. PATENT DOCUMENTS

| | | | | |
|---|---|---|---|---|
| 2,979,028 A * | 4/1961 | Zakely | ............................ | 182/3 |
| 3,179,468 A * | 4/1965 | Hinzie | ..................... | 297/423.17 |
| 3,442,427 A * | 5/1969 | Arnell et al. | ................... | 224/261 |
| 3,751,770 A * | 8/1973 | Italiano | ......................... | 24/697.1 |
| 3,794,281 A * | 2/1974 | Munsey | ......................... | 248/188 |
| 4,524,495 A * | 6/1985 | Hess | ............................ | 24/593.1 |
| 5,836,061 A * | 11/1998 | Castillo et al. | ................... | 24/702 |
| 6,019,561 A * | 2/2000 | Thomson et al. | ............... | 414/11 |
| 6,202,977 B1 * | 3/2001 | Chapman | ...................... | 248/505 |
| 6,311,884 B1 * | 11/2001 | Johnson | ......................... | 224/627 |
| 6,454,234 B1 * | 9/2002 | Westbrook | .................... | 248/317 |
| 6,539,593 B2 * | 4/2003 | Morris | ......................... | 24/265 R |
| 6,857,430 B2 * | 2/2005 | Morris | .......................... | 128/869 |
| 7,117,650 B2 * | 10/2006 | Dockery | .................... | 52/506.07 |
| 7,971,458 B2 * | 7/2011 | Gilbert | ............................. | 70/58 |
| 2002/0130508 A1* | 9/2002 | Schepers | ....................... | 280/809 |
| 2002/0148079 A1* | 10/2002 | Morris | ......................... | 24/265 R |
| 2004/0045559 A1* | 3/2004 | Morris | .......................... | 128/870 |
| 2004/0227860 A1* | 11/2004 | DePaolo et al. | ............... | 348/825 |

(Continued)

FOREIGN PATENT DOCUMENTS

| | | |
|---|---|---|
| EP | 1 754 927 A2 | 2/2007 |
| JP | 2003-264756 | 9/2003 |
| JP | 2006-304239 | 11/2006 |

*Primary Examiner* — Terrell McKinnon
*Assistant Examiner* — Christopher Garft
(74) *Attorney, Agent, or Firm* — Patterson Thuente Pedersen, P.A.

(57) ABSTRACT

A safety strap for securing flat panel displays to a support structure to prevent the flat panel display from tipping forward or side-to-side.

19 Claims, 6 Drawing Sheets

(56) References Cited

U.S. PATENT DOCUMENTS

| | | | |
|---|---|---|---|
| 2004/0245301 A1* | 12/2004 | Truong | 224/275 |
| 2005/0130812 A1* | 6/2005 | DiOrio et al. | 482/91 |
| 2009/0151834 A1* | 6/2009 | Bozkurt et al. | 152/213 R |
| 2009/0265902 A1* | 10/2009 | Gilbert | 24/704.1 |
| 2011/0214311 A1* | 9/2011 | Stonisch | 36/101 |
| 2011/0228176 A1* | 9/2011 | Takao | 348/836 |

\* cited by examiner

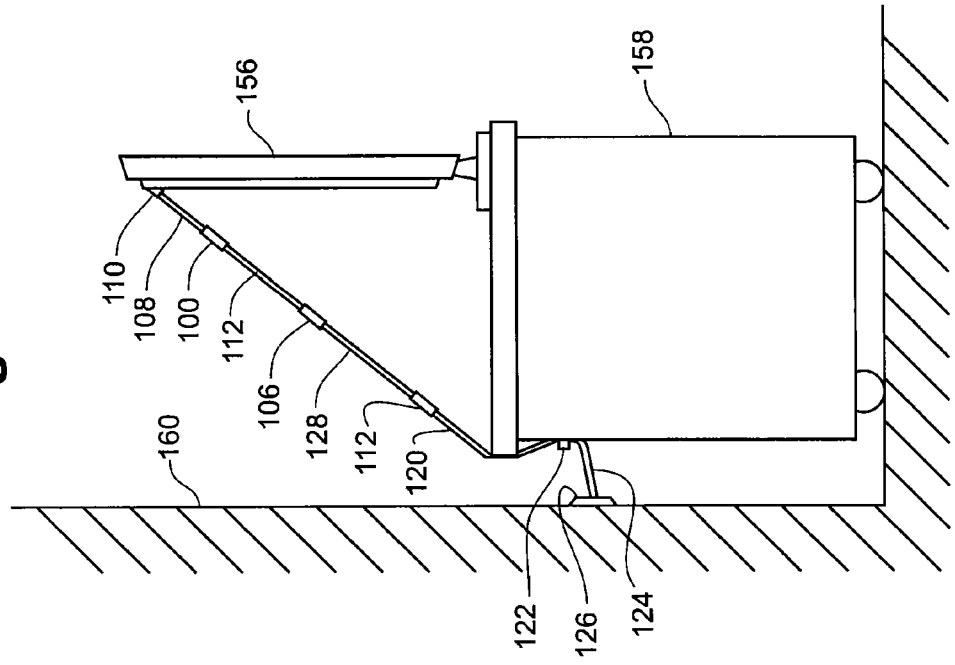
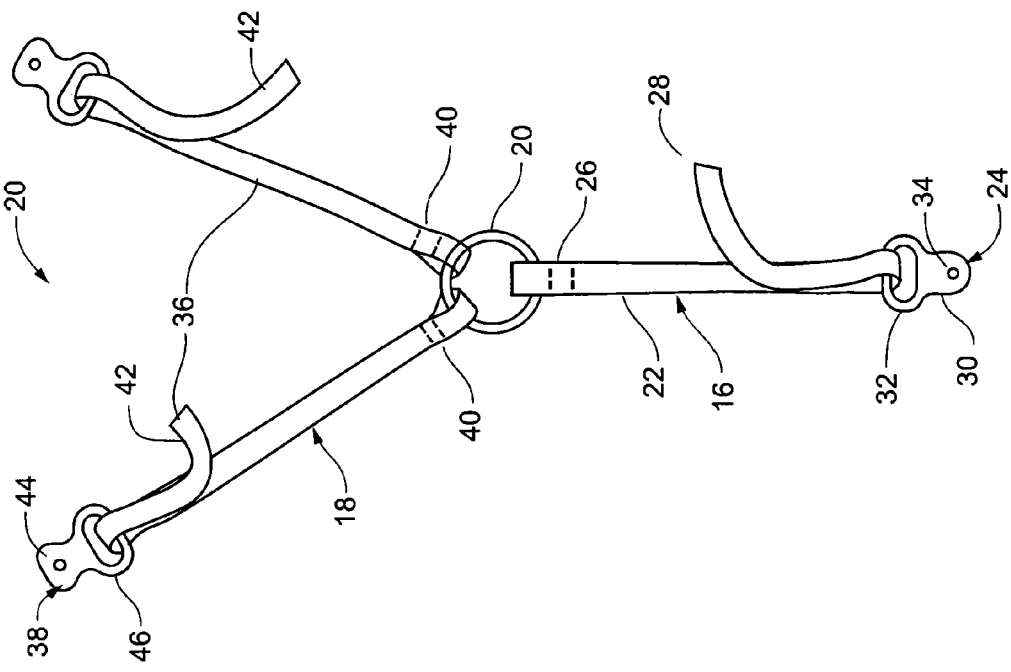

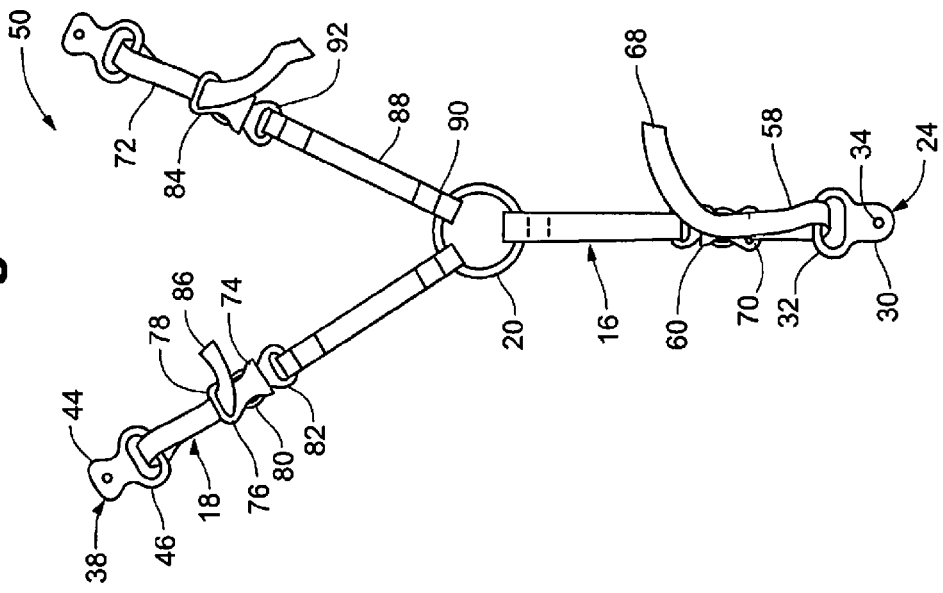
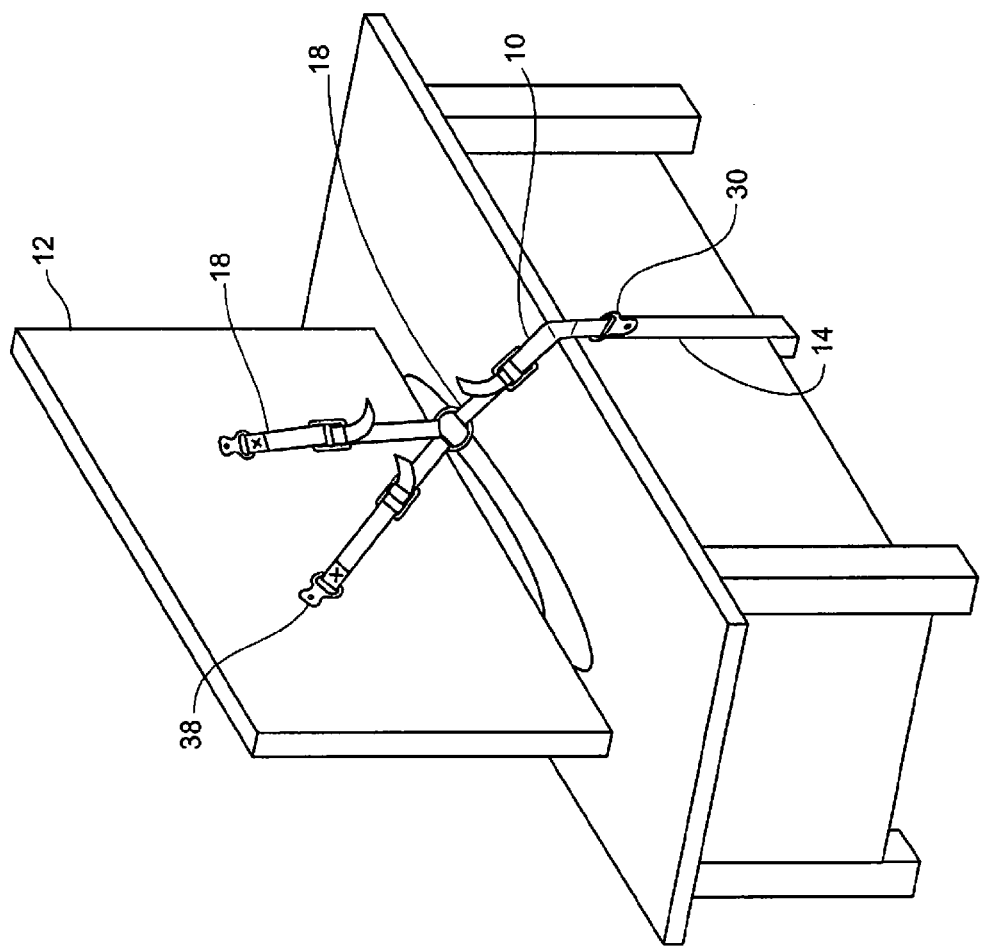

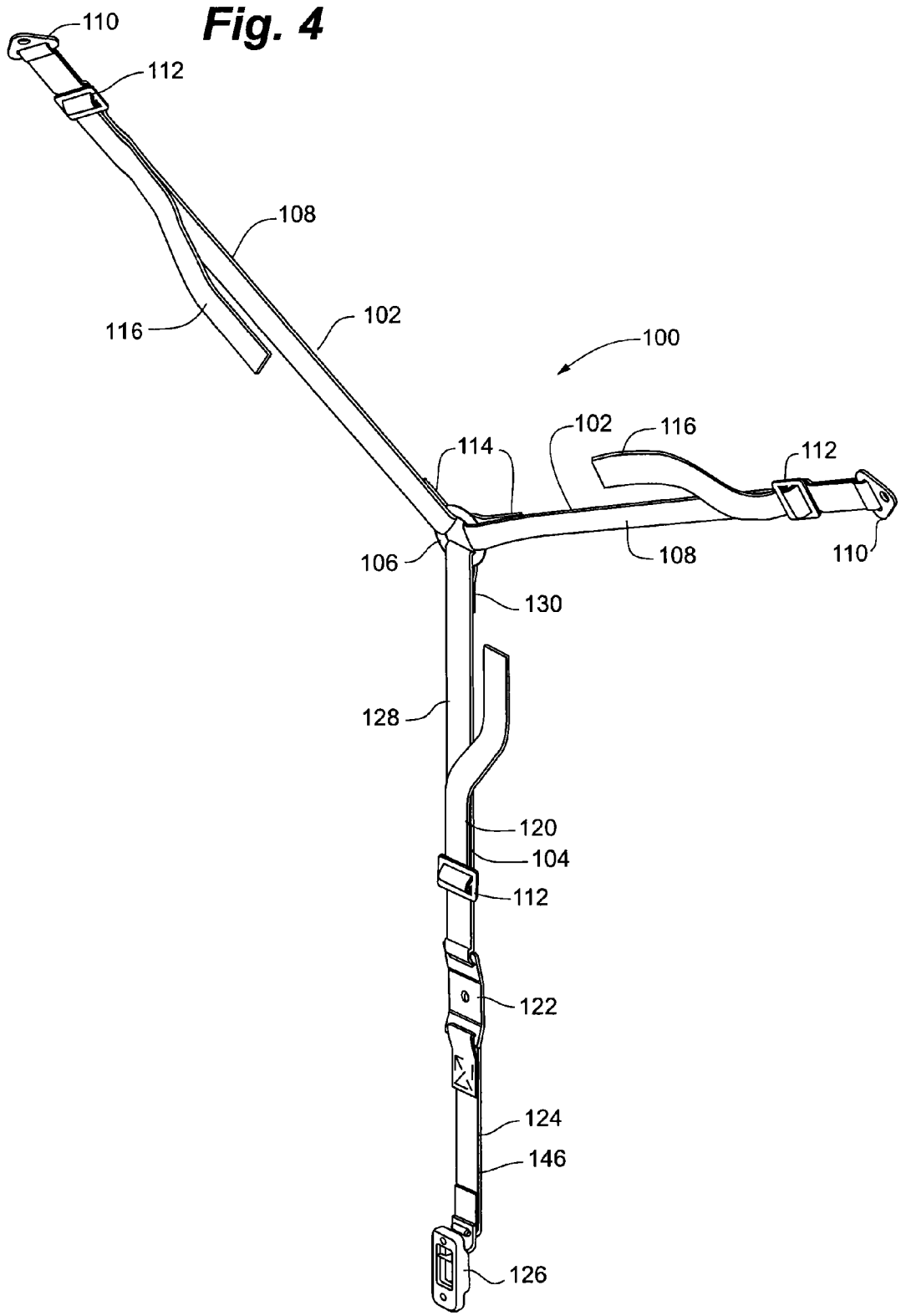

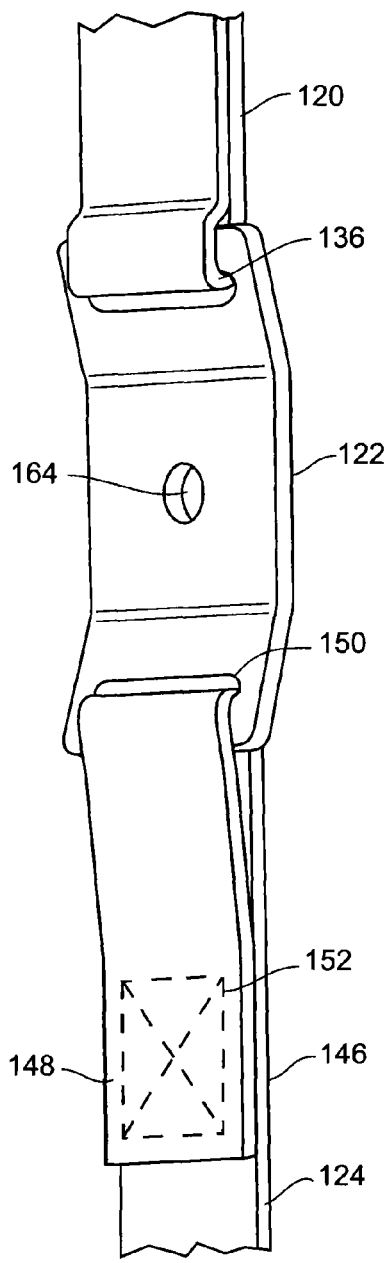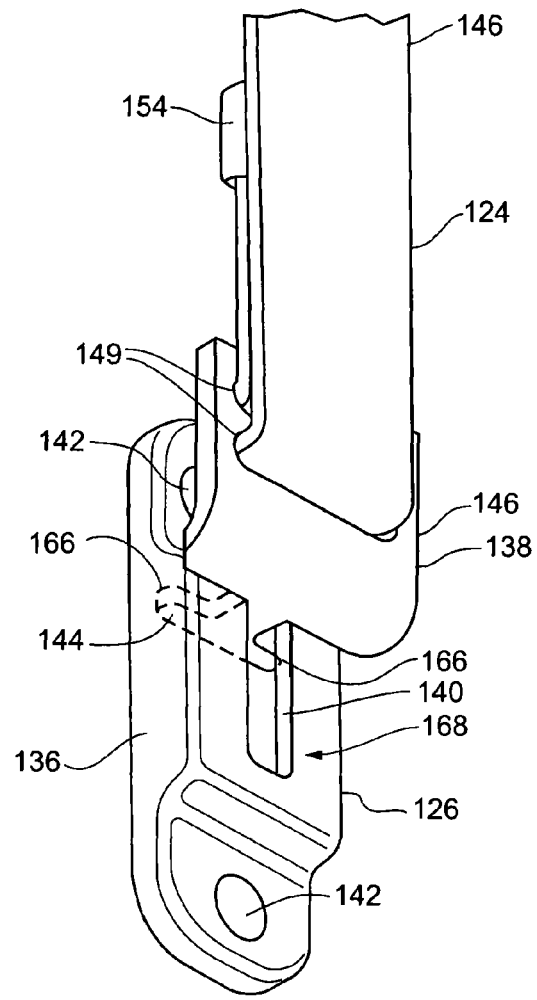

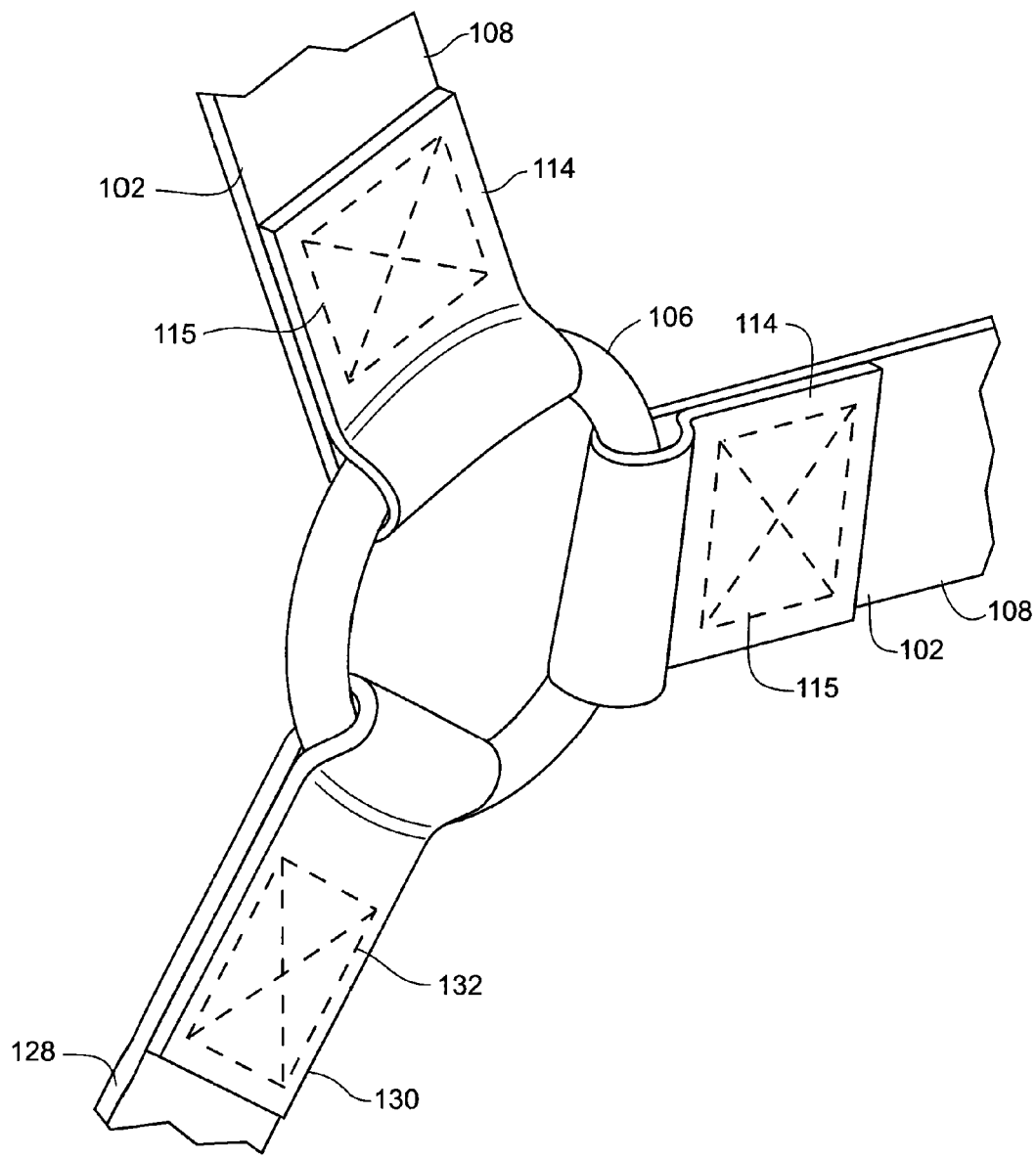

TELEVISION SAFETY STRAP

RELATED APPLICATIONS

This non-provisional application claims the benefit of U.S. Provisional Application No. 61/222,989, entitled TELEVISION SAFETY STRAP, and filed Jul. 3, 2009, said application being hereby fully incorporated herein by reference.

FIELD OF THE DISCLOSURE

The present invention is generally related to safety straps for preventing televisions from tipping over. Specifically, embodiments of the present invention are directed to a safety strap affixing a television to either the wall or supporting furniture to prevent the secured television from tipping forward or side-to-side.

BACKGROUND OF THE DISCLOSURE

Televisions typically comprise a large heavy display centered over a base adapted to keep the display upright. Televisions have traditionally included cathode ray tubes or projection systems that extended rearward from the face of the display, which required large bases to distribute the weight of the display. The large base helped balance the television and prevent the television from tipping over. However, in recent years, flat panel displays with relatively thin profiles have become increasingly popular and have all but replaced traditional televisions. Flat panel displays do not require the rearward extending cathode ray tubes or projection systems of traditional televisions and as a result have a very thin side profile. The thin profile of flat panel display allows a substantially smaller base to be used to support the display. However, the relatively high center of mass of the flat panel display and the small base increase the likelihood of the display tipping forward creating a substantial safety risk.

Similarly, wide screen televisions have also become increasingly popular and are quickly replacing traditional televisions with standard sized screens. Unlike standard television screens that are squarer in shape, wide screen televisions are more rectangular and can be significantly wider than tall. However, the relatively small base of flat panel displays and the wide shape of the display create a substantial risk of the television tipping over side-to-side in addition to the potential of tipping forward. The increased risk of tipping over either forward or side to side coupled with the heavy weight of the display creates a substantial risk of injury and damage to the display itself. As such, there is a need in the industry for a means of restraining televisions and preventing the displays from tipping over.

SUMMARY OF THE DISCLOSURE

The safety strap according to present invention secures the display to a fixed surface on the wall behind the display, the supporting furniture beneath the display, or both. The safety strap effectively links the rear of the display to the wall behind the display and/or the supporting furniture beneath the display to restrain the display against any tipping forces applied to the display.

In embodiments of the invention, the safety strap may generally include a mount assembly and a display assembly affixed to a central ring. The mount assembly further includes a mount strap linking a retaining mount to the central ring. The retaining mount is adapted to receive various fasteners for affixing the retaining mount to a fixed surface on either the wall or other fixed surfaces. Similarly, the display assembly includes at least two display straps each linking a display mount to the central ring. The display mounts are adapted to interface with integrated mounting points disposed on the rear of the display device.

According to an embodiment of the invention, the safety strap is affixed to the display at a point above the center of mass of the display and affixed to a fixed surface at a point below the center of mass of the display. The downward angle of the safety strap maximizes the support provided by the safety strap to the display. Similarly, according to an embodiment of the invention, the safety strap can be arranged in a "Y" orientation with the display straps forming the arms of the "Y" and the mount strap forming the stem of the "Y." The "Y" shape allows the safety strap to withstand not only tipping forces applied to the display that are parallel to the display, but also tipping forces applied at different angles to the display such perpendicular to the display that may cause the display to tip over sideways.

According to an embodiment of the invention, the central ring can further include a plurality of central straps each linking a buckle to the central ring. The buckles are adapted to operably engage the display and mount straps to link the display mounts and retaining mount to the central ring, respectively. The buckles each include an insert having a first d-ring for receiving and retaining the central strap and a frame having a second d-ring for receiving and retaining either a display strap or the mount strap. The buckle frame is adapted to releasably receive the insert such that the insert can be disengaged from the frame to separate the mount or display assemblies from the central ring. The modular design simplifies installation and removable of the safety strap as the various mounts can be first fixed in position before being joined together via the central ring.

In an embodiment, a safety strap for an electronic display includes a plurality of display strap assemblies, at least one support strap assembly, and a linking structure. Each of the plurality of display strap assemblies presents a pair of opposing ends, one end is shiftably coupled to the linking structure, and the other end is coupled to structure for attaching the display strap assembly to the electronic display. The support strap assembly includes a first portion shiftably coupled to the linking structure, and a second portion coupled to a wall coupling structure. The first and second portions of the support strap assembly are coupled with structure for attaching the support strap assembly to an article of furniture. Each display strap assembly may include an adjustment buckle for enabling adjustment of the length of the display strap assembly. The at least one support strap assembly may include an adjustment buckle for enabling adjustment of the length of the support strap assembly. The linking structure may be a circular ring. The wall coupling structure may include a body portion defining a slot, and an attachment clip with a t-shaped portion engagable in the slot.

In further embodiments, a method for preventing tipping of a flat panel display includes attaching a plurality of display strap assemblies to the flat panel display, the display strap assemblies coupled to a linking structure, attaching a support strap assembly to an article of furniture, the support strap assembly coupled to the linking structure, and tightening the display strap assemblies and the support strap assemblies so as to extend tautly between the flat panel display and the article of furniture. The method may further include attaching the support strap assembly to a wall. Attaching the support strap assembly to the wall may include fastening a wall attachment point to the wall, the wall attachment point including a body portion defining a slot, and an attachment clip with a t-shaped engagement portion. Attaching the support strap assembly to the wall includes may include engaging the t-shaped engagement portion of the attachment clip in the slot of the body portion.

In further embodiments, a kit for preventing tipping of an electronic display includes a safety strap having a plurality of display strap assemblies, at least one support strap assembly, and a linking structure. Each of the plurality of display strap assemblies presents a pair of opposing ends, one end shiftably coupled to the linking structure, the other end coupled to a display attachment point for attaching the display strap assembly to the electronic display. The support strap assembly includes a first portion shiftably coupled to the linking structure, and a second portion coupled to a wall coupling structure. The first and second portions of the support strap assembly are coupled with a furniture attachment point for attaching the support strap assembly to an article of furniture. The kit further includes a plurality of fasteners for fastening the display attachment point to the display and for fastening the furniture attachment point to the article of furniture, and instructions for coupling the safety strap to the display and the article of furniture. Each display strap assembly may include an adjustment buckle for enabling adjustment of the length of the display strap assembly. The at least one support strap assembly may include an adjustment buckle for enabling adjustment of the length of the support strap assembly. The linking structure may be a circular ring. The wall coupling structure may include a body portion defining a slot, and an attachment clip with a t-shaped portion engagable in the slot.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE FIGURES

The invention can be completely understood in consideration of the following detailed description of various embodiments of the invention in connection with the accompanying drawings, in which:

FIG. 1 is a front elevation view of a safety strap according to an embodiment of the invention;

FIG. 2 is a front elevation view of a safety strap according to an alternative embodiment of the invention;

FIG. 3 is a perspective view of the safety strap depicted in FIGS. 1 and 2 securing a display to a support structure;

FIG. 4 is a front perspective view of a safety strap according to a third embodiment of the invention;

FIG. 5 is a perspective view of the furniture coupling assembly portion of the safety strap of FIG. 4;

FIG. 6 is a perspective view of the wall coupling assembly of the safety strap of FIG. 4, with the body portion depicted in phantom for clarity;

FIG. 8 is a side elevation view of the safety strap of FIG. 4 coupling an electronic display with a piece of furniture and a wall; and FIG. 9 is a perspective view of the linking structure of the safety strap of FIG. 4.

Figure 7:
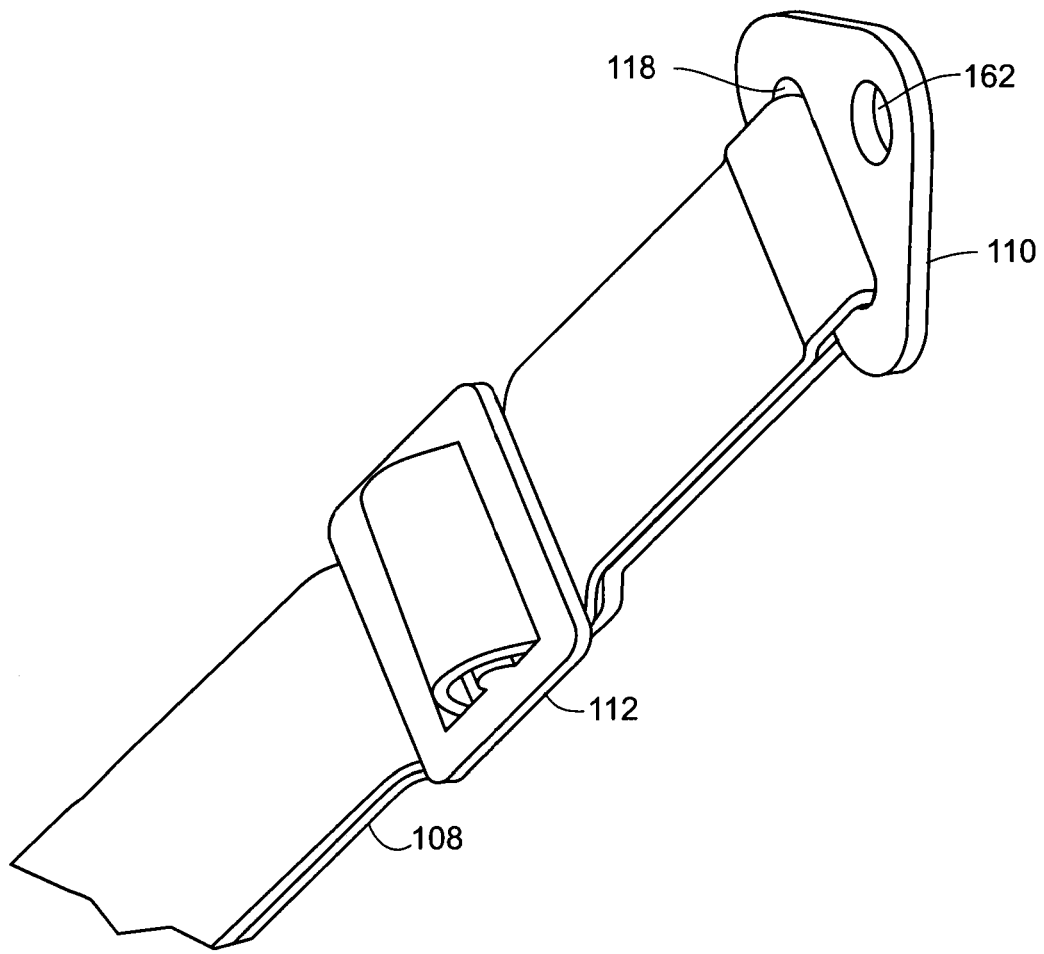
FIG. 7 is a perspective view of the display coupling assembly of the safety strap of FIG. 4.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Referring to FIGS. 1 and 3, a safety strap 10 according to an embodiment of the present invention for operably affixing a display 12 to a support structure 14 is depicted. The safety strap 10 extends from the rear of the display 12 to the support structure 14 generally behind or underneath the display 12 so as to prevent the display 12 from tipping forward or side-to-side. The support structure 14 can be disposed on the wall behind the display 12 or supporting furniture for supporting the display 12, such as an entertainment center. The support structure 14 is typically a wall constructed from wood, metal or drywall, suitable for retaining the weight of the display 12 if the display 12 begins to tip forward or side-to-side.

Safety strap 10 generally includes mount assembly 16, display assembly 18 and central ring 20. Mount assembly 16 generally includes mount strap 22 and retaining mount 24. Mount strap 22 generally includes looped proximate end 26 and distal end 28 operably connected to retaining mount 24. Mount strap 22 may be constructed from, without limitation, nylon, Kevlar and other similar flexible materials capable of retaining the weight of the attached display. Mount strap 22 may be made in different lengths depending on the size of display 12 and distance between display 12 and support structure 14.

Retaining mount 24 generally includes tab 30 affixed to d-ring 32 for receiving distal end 28 of mount strap 22. Distal end 28 of mount strap 16 is threadable through B-ring 32 of retaining mount 24 to secure mount strap 16 to retaining mount 24. The effective length of mount strap 16 can be adjusted by adjusting the length of mount strap 16 threaded through d-ring 32. Alternatively, distal end 28 of mount strap 22 can be looped around d-ring 32 to affix mount strap 22 to retaining mount 24 at a fixed length. Tab 28 and d-ring 32 can be made from, without limitation, nylon, Kevlar, lightweight metals or other materials such as polymer plastic. Fastening means 34 is insertable through tab 30 to secure tab 30 to support structure 14. Fastening means 34 can include, but is not limited to, nails, screws, rivets and other suitable fastening means 34 capable of securing mount assembly 16 to support structure 14. According to an embodiment of the invention, a plurality of fastening means 34 are insertable through tab 30 to further secure fastening means 34 to support structure 14.

Display assembly 18 generally includes at least two display straps 36 and at least two corresponding display mounts 38. The at least two display straps 36 each generally include looped proximate end 40 and distal end 42 operably connected to display mount 38. Display straps 36 may be made in different lengths depending on the size of display 12 and distance between display 12 and support structure 14. Display mount 38 generally includes bracket 44 and integrated d-ring 46 adapted to receive distal end 36 of television strap 18. Distal end 40 of display strap 36 is threaded through integrated d-ring 46 to secure display strap 36 to display mount 38. The effective length of display strap 36 can be adjusted by adjusting the length of display strap 36 threaded through d-ring 46. Alternatively, distal end 40 of display strap 36 can be looped around d-ring 46 to affix display strap 36 to display mount 38 at a fixed length. Display mount 38 can be made from, without limitation, plastic, aluminum, steel and other lightweight resilient materials.

Fastening means 48 is insertable through bracket 44 to affix bracket 44 to the mounting points disposed on the rear of display 12. The mounting points are those typically used to mount display 12 to a wall or furniture display mount. The type of fastening means 48 for interfacing with the mounting points and position of the mounting points can vary from display to display depending on the manufacturer and the size of the display. Fastening means 48 can include, but is not limited to, nails, screws, rivets and other suitable fastening means capable of interfacing with the mounting points of display 12.

As depicted in FIG. 1, central ring 20 adjustably links mount assembly 16 to display assembly 18. Central ring 20 is adapted to fit through looped proximate end 26 of mount strap 22 and looped proximate ends 40 of each of display straps 36 such that mount strap 22 and display straps 36 are rotatable around the circumference of central ring 20. According to an embodiment of the invention, display straps 36 and mount strap 22 can be arranged in a "Y" shape, wherein display straps 36 form the "arms" of the "Y" and mount strap 16 forms the "stem" of the "Y." The arrangement allows safety strap 10 to prevent display 12 from not only tipping forward, but also retraining display 12 from tipping side-to-side. The angle of display straps 36 relative to mount strap 22 are adjustable to account for the different positions of the mounting points on different televisions.

As depicted in FIG. 3, safety strap 10 is affixed to display 12 at mounting points near or above the center of mass of display 12 to insure safety strap 10 can effectively retain display 12 and prevent display 12 from tipping forward. According to a preferred embodiment of the present invention, the effective length of mount strap 22 and display straps 26 are adjusted such that safety strap 10 is pulled taut to prevent any freedom of movement in display 12. As depicted, safety strap 10 is also affixable to support structure 14 at a point below the center of mass of display 12 to prevent display 12 from tipping over as well as hiding safety strap 10 behind display 12. According to an embodiment of the invention, safety strap 10 is affixable to support structure 14 at a point near or above the center of mass of display 12 to provide an alternative mounting arrangement depending on the needs of the user.

As depicted in FIG. 2, an alternative embodiment of the present invention includes a modular safety strap 50 sharing a number of the same elements with safety strap 10. Adjustable safety strap 50 generally includes modular mount assembly 52, modular display assembly 54 and central assembly 56. Adjustable wall mounting assembly 52 generally includes mount strap 58, mount buckle 60 and retaining mount 24. Mount buckle 60 further includes frame 62 defining first d-ring 64 and insert 66 defining second d-ring 68. Mount strap 58 generally includes fixed end 70 affixed to frame 62 of mount buckle 60 and loose end 68 threadable through d-ring 32 of retaining mount 24 to link retaining mount 24 to mount buckle 60. Loose end 68 is threadable through d-ring 64 of mount buckle 60 such that the effective length of mount strap 58 is adjustable by adjusting the length of mount strap 58 threaded through first d-ring 64.

Display assembly 54 generally includes at least two sets of display straps 72, display buckles 74 and display mounts 38. Display buckles 74 each generally include frame 76 defining first d-ring 78 and insert 80 defining second d-ring 82. Display strap 72 generally includes fixed end 84 affixed to frame 76 of display buckle 74 and loose end 86 threadable through d-ring 46 of display mount 38. Loose end 86 is threadable through first d-ring 78 of display buckle 74 such that the effective length of display strap 72 is adjustable by adjusting the length of display strap 72 threaded through first d-ring 78 of display buckle 74.

Central assembly 58 generally includes central ring 20 and a plurality of central straps 88. Central straps 88 each generally include proximate looped end 90 and distal looped end 92. Central ring 20 is adapted to fit within proximate looped end 90 of each central strap 88 such that central straps 88 are rotatable around the circumference of central ring 20. Distal looped end 90 is adapted to receive second d-ring 68 of mount buckle 60 or second d-ring 82 of display buckle 74 to operably link adjustable wall mounting assembly 52 or adjustable television mounting assemblies 54 to central assembly 58.

Inserts 66, 80 and frames 62, 76 of mount buckle 60 and display buckle 74, respectively, are adapted to releasably interlock such that first d-ring 64, 78 and second d-ring 68, 82 can be separated. The "quick release" mount and display buckles 60, 74 allow users to install and disassemble mount and display assemblies 52, 54 independently increasing the speed with which modular safety strap 50 can be installed and removed.

Another embodiment of the safety strap 100 of the present invention is depicted in FIGS. 4-9. Safety strap 100 generally includes display strap assemblies 102, support strap assembly 104, and linking structure 106. Each display strap assembly 102 generally includes a single length 108 of flexible strap material such as nylon webbing, display attachment point 110, and adjustment buckle 112. One end 114 of strap material 108 is looped through linking structure 106 and sewn to the body of strap material 108 with stitching 115 so as to permanently attach display strap assembly 102 to linking structure 106. The other end 116 runs through adjustment buckle 112, through strap aperture 118 in display attachment point 110 and back through adjustment buckle 112.

Support strap assembly 104 generally includes furniture coupling strap portion 120, furniture attachment point 122, wall coupling strap portion 124, and wall attachment point 126. Furniture coupling strap portion 120 generally includes a single length 128 of flexible strap material such as nylon webbing and adjustment buckle 112. One end 130 of strap material 128 is looped through linking structure 106 and sewn to the body of strap material 128 with stitching 132 so as to permanently attach furniture coupling strap portion 120 to linking structure 106. The other end 134 runs through adjustment buckle 112, through first aperture 136 in furniture attachment point 122, and back through adjustment buckle 112.

Wall attachment point 126 generally includes body portion 136 and attachment clip 138. Body portion 136 defines slot 140, and a pair of apertures 142 for receiving fasteners (not depicted) to attach wall attachment point 126 to a wall. Attachment clip 138 defines t-shaped engagement portion 144 which extends outwardly from body portion 146. Body portion 146 defines a pair of adjacent slots 149.

Wall coupling strap portion 124 generally includes a single length 146 of flexible strap material such as nylon webbing. One end 148 of strap material 146 is looped through aperture 150 of furniture attachment point 122 and is sewn to the body of strap material 146 with stitching 152 so as to permanently attach wall coupling strap portion 124 to furniture attachment point 122. The other end 154 is looped through slots 149 of attachment clip 138 and is sewn to the body of strap material 146 so as to permanently attach wall coupling strap material 146 to attachment clip 138 of wall attachment point 126.

In use, safety strap 100 can be used to securely couple a flat panel display 156 to a piece of furniture 158 and wall 160 to inhibit tipping of display 156 as depicted in FIG. 8. Display attachment points 110 are attached to the rear of display 156 with fasteners (not depicted) through apertures 162. Preferably, display attachment points 110 are coupled to display 156 proximate both upper corners of the display. Furniture attachment point 122 is attached to furniture 158 with a fastener (not depicted) through aperture 164. Body portion 136 of wall attachment point 126 is fastened to wall 160 with fasteners (not depicted) through apertures 142. T-shaped engagement portion 144 is then engaged in slot 140 by inserting t-shaped engagement portion 144 sideways into slot 140 and twisting so that ends 166 of t-shaped engagement portion 144 are retained behind outer wall 168 of body portion 136. Straps 108, 128, can be pulled through adjustment buckles 112 as needed to tighten the straps tautly and eliminate any slack that would permit tipping of display 156. When desirable to move furniture 158 away from wall 160, for cleaning for example, t-shaped engagement portion 144 is can be disengaged from slot 140 by the reverse of the insertion procedure.

It will be appreciated that the attachment of display strap assemblies 102 and support strap assembly 104 to linking structure 106 enables these straps to shift around the circumference of linking structure 106. This enables asymmetric positioning of display attachment points 110 on display 156 if necessary and increases installation flexibility.

It will be further appreciated that, although two display strap assemblies 102 and one support strap assembly 104 are depicted in the embodiment of FIGS. 4-9, other embodiments may have any other number of display strap assemblies 102 and support strap assemblies 104, and that such embodiments are contemplated within the scope of the present invention.

It will also be appreciated that safety strap 100 can be packaged as a kit for distribution to customers for preventing tipping of a flat panel display. The kit may include safety strap 100, a fastener package, installation tools, and installation instructions.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative embodiments.

What is claimed is:

1. A safety strap for an electronic display, comprising:
   a plurality of display strap assemblies;
   at least one support strap assembly; and
   a linking structure, each of the plurality of display strap assemblies presenting a pair of opposing ends, one end shiftably coupled to the linking structure, the other end coupled to a display mount structure for attaching the display strap assembly to the electronic display, the support strap assembly including a first portion shiftably coupled to the linking structure, and a second portion coupled to a wall coupling structure, the first and second portions of the support strap assembly coupled with an another structure for attaching the support strap assembly to an article of furniture, wherein the at least one support strap assembly and each display strap assembly of the plurality of display strap assemblies are each circumferentially shiftable relative to each other and relative to the linking structure, and wherein the circumferential shift of the at least one support strap assembly and each display strap assembly of the plurality of display strap assemblies is shiftable about 360 degrees.

2. The safety strap of claim 1, wherein each display strap assembly includes an adjustment buckle for enabling adjustment of the length of the display strap assembly.

3. The safety strap of claim 1, wherein the at least one support strap assembly includes an adjustment buckle for enabling adjustment of the length of the support strap assembly.

4. The safety strap of claim 1, wherein the linking structure comprises a circular ring.

5. The safety strap of claim 1, wherein the wall coupling structure comprises a body portion defining a slot, and an attachment clip with a t-shaped portion engagable in the slot.

6. A method for preventing tipping of a flat panel display, comprising:
   attaching a plurality of display strap assemblies to the flat panel display, the display strap assemblies shiftably coupled to a linking structure such that each display strap assembly of the plurality of display strap assemblies are each circumferentially shiftable relative to each other and relative to the linking structure, and wherein the circumferential shift of each display strap assembly of the plurality of display strap assemblies is shiftable about 360 degrees;
   attaching a support strap assembly to an article of furniture, the support strap assembly coupled to the linking structure; and
   tightening the display strap assemblies and the support strap assemblies so as to extend tautly between the flat panel display and the article of furniture.

7. The method of claim 6, further comprising attaching the support strap assembly to a wall.

8. The method of claim 7, wherein attaching the support strap assembly to the wall includes fastening a wall attachment point to the wall, the wall attachment point including a body portion defining a slot, and an attachment clip with a t-shaped engagement portion.

9. The method of claim 8, wherein attaching the support strap assembly to the wall includes engaging the t-shaped engagement portion of the attachment clip in the slot of the body portion.

10. A kit for preventing tipping of an electronic display, the kit comprising:
    a safety strap including:
       a plurality of display strap assemblies;
       at least one support strap assembly; and
       a linking structure, each of the plurality of display strap assemblies presenting a pair of opposing ends, one end shiftably coupled to the linking structure, the other end coupled to a display attachment point for attaching the display strap assembly to the electronic display, the support strap assembly including a first portion shiftably coupled to the linking structure, and a second portion coupled to a wall coupling structure, the first and second portions of the support strap assembly coupled with a furniture attachment point for attaching the support strap assembly to an article of furniture, wherein the at least one support strap assembly and each display strap assembly of the plurality of display strap assemblies are each circumferentially shiftable relative to each other and relative to the linking structure, and wherein the circumferential shift of the at least one support strap assembly and each of the plurality of display strap assemblies is shiftable about 360 degrees; and a plurality of fasteners for fastening the display attachment point to the display and for fastening the furniture attachment point to the article of furniture; and instructions, fixed in a tangible medium, for coupling the safety strap to the display and the article of furniture.

11. The kit of claim 10, wherein each display strap assembly includes an adjustment buckle for enabling adjustment of the length of the display strap assembly.

12. The kit of claim 10, wherein the at least one support strap assembly includes an adjustment buckle for enabling adjustment of the length of the support strap assembly.

13. The kit of claim 10, wherein the linking structure comprises a circular ring.

14. The kit of claim 10, wherein the wall coupling structure comprises a body portion defining a slot, and an attachment clip with a t-shaped portion engagable in the slot.

15. A safety strap for an electronic display, comprising:
at least one display strap assembly;
at least one support strap assembly; and
a linking structure, the at least one display strap assembly presenting a pair of opposing ends, one end shiftably coupled to the linking structure, the other end coupled to a mount structure for attaching the display strap assembly to the electronic display, the support strap assembly including a first portion shiftably coupled to the linking structure, and a second portion coupled to an attachment member for securing the at least one support strap to a fixed structure, wherein the at least one support strap assembly and the at least one display strap assembly are each circumferentially shiftable relative to each other and relative to the linking structure, and wherein the circumferential shift of the at least one support strap assembly and the at least one display strap assembly is shiftable about 360 degrees.

16. The safety strap of claim 15, wherein the fixed structure is a wall or a floor of a structure.

17. The safety strap of claim 15, wherein the first and second portions of the at least one support strap assembly are coupled with structure for attaching the support strap assembly to an article of furniture.

18. The safety strap of claim 15, wherein the at least one display strap assembly includes an adjustment buckle for enabling adjustment of the length of the at least one display strap assembly.

19. The safety strap of claim 15, wherein the at least one support strap assembly includes an adjustment buckle for enabling adjustment of the length of the at least one support strap assembly.

* * * * *